D. EDWARDS.
STEAM-TRAPS.
No. 193,938. Patented Aug. 7, 1877.
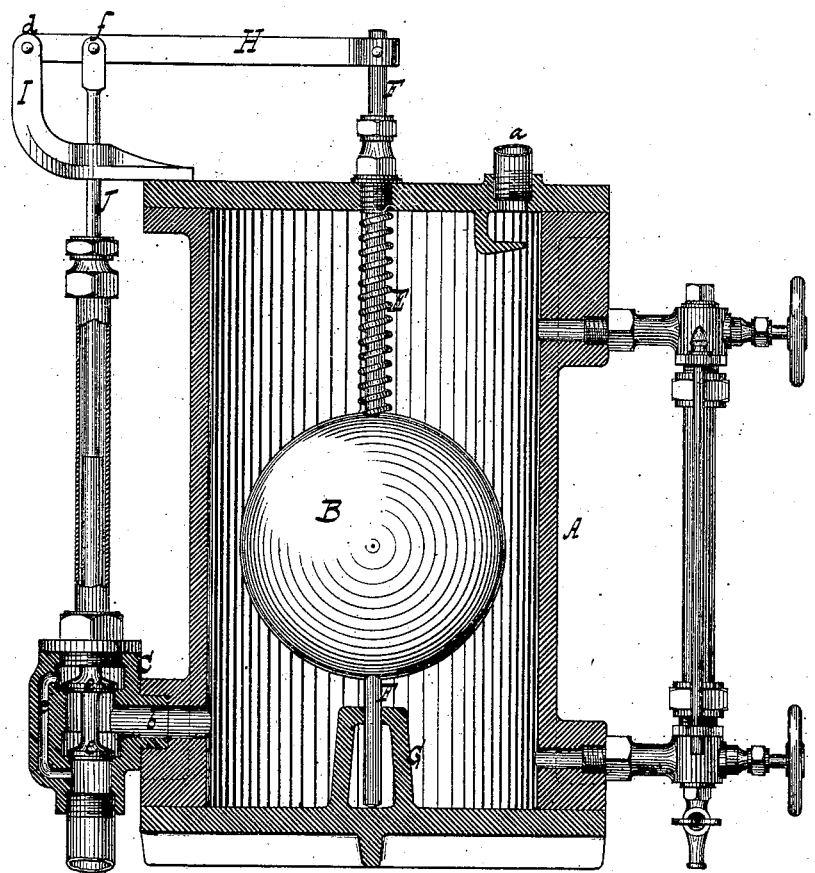

UNITED STATES PATENT OFFICE.

DAVID EDWARDS, OF NEW YORK, N. Y., ASSIGNOR TO HIMSELF AND FREDERICK C. DURANT, OF SAME PLACE.

IMPROVEMENT IN STEAM-TRAPS.

Specification forming part of Letters Patent No. 193,938, dated August 7, 1877; application filed July 14, 1877.

*To all whom it may concern:*

Be it known that I, DAVID EDWARDS, of the city, county, and State of New York, have invented a new and useful Improvement in Steam-Traps, which improvement is fully set forth in the following specification, reference being had to the accompanying drawing, which represents a vertical central section.

This invention consists in the combination of a float, two valves mounted on the same, a lever which connects the valve-stem with the stem of the float, a valve-chamber which incloses the two valves and connects with the main chamber of the trap by a passage opening between said two valves, and a pressure-relieving channel, which extends from the upper part of the valve-chamber to the waste-pipe, the whole being so constructed that the two valves remain balanced when raised from their seats, as well as when they are closed down, and thereby a trap is obtained which is very sensitive and not liable to get out of order.

In the drawing, the letter A designates the main chamber of my trap, into which the liquid to be trapped flows through an aperture, *a*.

In the interior of the main chamber A is a float, B, which is mounted on rod F, that is guided below in a standard, G, secured to the bottom of the main chamber, while its upper end extends out through the top of the main chamber, and is connected to a lever, H. This lever has its fulcrum on a pivot, *d*, secured in an arm, I, which is firmly attached to the top or to any other part of the main chamber. This main chamber communicates, by a passage, *b*, with the valve-chamber C, in the interior of which are formed the seats for two valves, *e e'*, one above and the other beneath the passage *b*.

The two valves *e e'* are mounted on a common stem, J, which extends up through the top of the valve-chamber and is connected to the lever H by means of a pivot, *f*. The weight of the float B, therefore, has a tendency to depress the valves on their seats, and if the liquid accumulates in the main chamber and the float is buoyed up, the valves are raised from their seats, and the liquid from the main chamber escapes through the passage *b*, the valve-chamber C, and the waste-pipe *g*, which extends from the bottom of the valve-chamber.

The area of the upper surface of the valve *e* is equal to the area of the lower surface of the valve *e'*, so that when the valves are closed they are perfectly balanced, and a small upward pressure on the float B is sufficient to raise the valves from their seats. As soon as the valves have been raised, however, a portion of the liquid which enters the valve-chambers rises up past the upper valve *e'*, and, by exerting a certain pressure on the upper large surface of said valve, has a tendency to force both valves back on their seats, and to disturb the correct operation of the trap.

This difficulty I have obviated by means of a pressure-relieving channel, *c*, which extends from the upper part of the valve-chamber down to the waste-pipe. Through this all the liquid which rises up past the valve *e'* is free to escape, and the two valves *e e'* remain balanced under all circumstances.

By these means a trap is obtained which is very sensitive in its operation, any slight change in the level of the liquid in the main chamber A being sufficient to open or to close the valves.

In some cases I have found it desirable to expose the float to the action of a spring, E, so as to insure the correct seating of the valves; but if the float is large and comparatively heavy, no such spring is required.

What I claim as new, and desire to secure by Letters Patent, is—

The combination, with the main chamber A, float B, lever H, valves *e e'*, and valve-chamber C, of a pressure-relieving channel, *c*, extending from the top of the valve-chamber to the waste-pipe, said valve-chamber being connected with the main chamber of the trap, and made to communicate therewith through a passage, *b*, all substantially as herein shown and described.

In testimony that I claim the foregoing I have hereunto set my hand and seal this 12th day of July, 1877.

DAVID EDWARDS. [L. S.]

Witnesses:
 W. HAUFF,
 CHAS. WAHLERS.